United States Patent [19]

Kajii

[11] 4,123,656

[45] Oct. 31, 1978

[54] STORAGE TYPE SMOKE DETECTOR

[75] Inventor: Shigeru Kajii, Kawasaki, Japan

[73] Assignee: Hochiki Corporation, Tokyo, Japan

[21] Appl. No.: 813,182

[22] Filed: Jul. 6, 1977

[30] Foreign Application Priority Data

Jul. 7, 1976 [JP] Japan ........................ 51-8940151[U]

[51] Int. Cl.$^2$ ................................................ G01T 1/18

[52] U.S. Cl. .................................... 250/381; 340/529; 340/629

[58] Field of Search ............................... 250/381, 388; 340/237 S; 328/1

[56] References Cited

U.S. PATENT DOCUMENTS 3,872,449 3/1975 Scheidweiler .................... 340/237 S

*Primary Examiner*—Davis L. Willis

[57] ABSTRACT

In a storage type smoke detector which requires a predetermined time after an ionization smoke sensor detects a fire before a fire warning is issued, a charging circuit including a capacitor connected to a power supplying line is coupled with a discharging circuit for periodically discharging a voltage charged in the capacitor, and the discharging circuit is periodically closed by a P-channel type field effect transistor which is connected to an output end the ionization smoke sensor and which is supplied with a series of oscillating pulse.

4 Claims, 4 Drawing Figures

STORAGE TYPE SMOKE DETECTOR

BACKGROUND OF THE INVENTION

The invention relates to a storage type smoke detector comprising a capacitor connected to a power supplying line and a discharge control circuit for periodically discharging a voltage charged in the capacitor, and particularly to a storage type smoke detector having a field effect transistor for operating to periodically close a discharge control circuit upon no detection of a fire and to open this circuit upon detection of a fire.

A known storage type smoke detector is disclosed in U.S. Pat. No. 3,872,449, which is based on a time difference between a long time constant to integrate smoke detection output and a short time constant to discharge as shown in the FIG. 1. A charging path comprising a series resistor R and capacitor C is connected to an output end of a threshold detector and a discharging path connected to the charging path is comprised of a series diode and resistor *r*. The capacitor C is charged by a fire indication signal exceeding the threshold level and is rapidly discahrged upon drop in signal level exceeding the threshold level. Since the threshold detector is normally in a OFF state for so long time before a fire arises, it is liable to conduct wrongly by a disturbance noise intruded from a power supplying line or induced by a high frequency electromagnetic wave. Such disturbance noise occasionally reaches 500–700 volts.

Another storage type smoke detector is comprised of a capacitor connected in parallel to a discharging circuit having a pair of transistors. The transistor pair which periodically switches on to close the discharging circuit is further coupled with and controlled by a third transistor which may conduct upon receipt of a smoke detection output from a smoke sensor. One transistor of the transistor pair defines a path to discharge a capacitor voltage while the other transistor holds the former conductive, and this transistor pair is adapted to operate with pulse signals. Since the third transistor is normally in a OFF state until a fire arises, it is also liable to wrongly conduct upon receipt of such disturbance noise so as to continuously charge the capacitor without discharge.

A general smoke detector has a very high impedance in order to reduce a power current dissipation for a long time before a fire arises, and accordingly, such a transistor that is normally put in a OFF state until it turns on to stop switching the transistor pair thereby continuing to charge the capacitor upon arising of a fire, is liable to wrongly turn on and to continuously charge the capacitor by disturbance noise, inspite of no fire. However, because a high impedance circuit is likely to respond to a disturbance noise to drop the impedance, a transistor for controlling a discharging circuit of the capacitor should be normally conductive thereby to render less susceptible to disturbance noises.

SUMMARY OF THE INVENTION

An object of the present invention is to provide a storage type smoke detector comprised of a capacitor connected to a power supplying line and a discharge control circuit including a transistor element connected in parallel to the capacitor for periodically conducting to discharge a capacitor voltage for a normal detection time.

Another object of the invention is to provide a storage type smoke detector in which a discharge circuit connected in parallel to a capacitor is periodically controlled to discharge a capacitor voltage by a P-channel type field effect transistor responsive to impedance change of an ionization smoke sensor.

Still another object of the present invention is to provide a storage type smoke detector in which a series of pulses are produced by an oscillating means for periodically closing a discharging circuit and also for charging a capacitor.

A false fire warning resulting from an occasionally continuous charge of a capacitor which is caused to open a discharge circuit by a disturbance noise can be obviated by the use of such a transistor that may periodically drop a high impedance of a detector's circuit for closing a discharge circuit of a capacitor. When a disturbance noise affects a control gate for discharging a capacitor voltage, this will conduct to close the discharge circuit thereby stopping charging the capacitor. Standing on this effect, the storage type smoke detector according to the invention uses a P-channel type field effect transistor for the purpose of controlling a discharging circuit of a capacitor, and this gate transistor is turned off by receiving an output from a junction point between an ionization smoke detection chamber and a reference chamber (or a reference resistance element). This transistor which has the gate received the output from a smoke sensor and the source applied a series of pulses can periodically switch on to discharge a capacitor voltage within each pulse duty cycle so long as a fire does not arise. Because this gate transistor is surrounded with high impedance elements and is able to drop the high impedance upon conduction thereof, most disturbance noises are likely to switch on the gate transistor and concurrently to discharge a capacitor voltage by closing a discharging circuit. The capacitor can not be continuously charged to a predetermined voltage effective to urge an issuing of fire warning. On the other hand, when a fire arises the gate transistor turns off by receiving an output from a smoke sensor. As the result, while the discharging circuit is open the capacitor can be charged to a predetermined voltage by a current supplied through through the power supplying line thereby activating a switching circuit to issue a fire warning.

Thus, the storage type smoke detector according to the present invention is comprised of an ionization smoke sensor, a capacitor connected to a power supplying line, a P-channel type field effect transistor connected to the output end of the smoke sensor, a discharging circuit to be controlled by the field effect transistor and connected in parallel to the capacitor, a switching circuit connected across the capacitor for issuing a fire warning by receiving a capacitor a capacitor voltage reached to a predetermined value, and an oscillating circuit for periodically conducting the field effect transistor. The discharging circuit is further preferably comprised of a resistor and a transistor in series connected across the capacitor, and the transistor is connected the base to the drain of the field effect transistor. Moreover, a transistor is connected between the source of the field effect transistor and the oscillateng circuit for applying an amplified pulse to this field effect transistor. If in the combination, the collector and the emitter of the transistor are interposed in the power supplying line leading to the capacitor, and the remaining base is connected to the oscillator circuit, a series of oscillating pulse can apply both to the field effect transistor and the capacitor.

BRIEF DESCRIPTION OF THE DRAWINGS

Other features and advantages of the storage type smoke dector according to the invention will be apparent from the disclosure and appended claims and drawings in which:

DESCRIPTION OF THE PREFERRED EMBODIMENT

Figure 3:
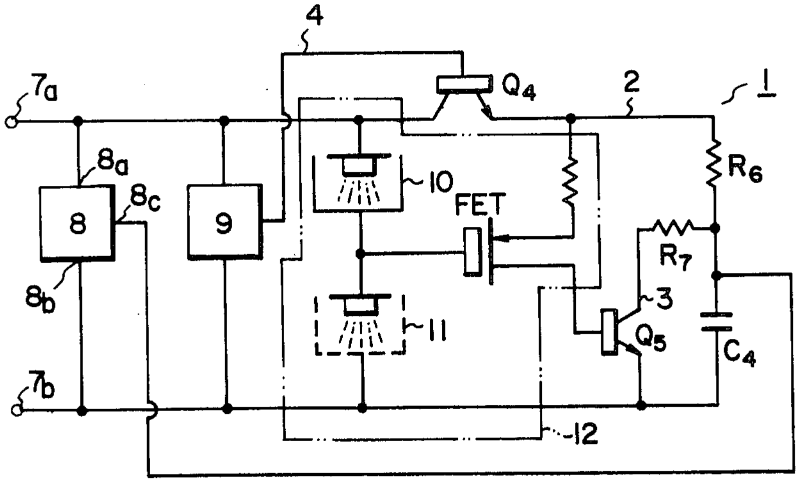
FIG. 3 is a circuit illustrating an embodiment according to the present invention.

The storage type smoke detector according to the invention illustrated in the FIG. 3 is provided with a pair of connection terminals 7*a* and 7*b* which are connected to a pair of two wires for sending a fire signal and also for supplying a power source current linking with a signal receiver. A switching circuit 8 is connected between the pair of connection terminals, and an oscillator circuit 9 is connected in parallel across the swiching circuit 8. An ionization smoke sensor having an inner reference chamber 10 and an outer ionization detection chamber 11 is connected across the oscillator circuit 9, and a junction point M between these high impedance chambers 10 and 11 connects to the gate of a P-channel type field effect transistor FET of which the source is connected to the power supplying end extended from the connection terminal 7*a*. The combination of the ionization smoke sensor and the FET performs as a smoke detection circuit 12. A transistor Q4 is interposed between the power supplying side of the chamber 10 and the source of the FET by connecting the collector to the power supplying side and the emitter to the source, respectively, and the base of this transistor Q4 is connected to the oscillator circuit 9 through a line 4. Because the field effect transistor FET is arranged to receive the series of pulses from the source and to always input the output of the ionization smoke sensor from the gate, the FET periodically switches on and produces an output pulse signal in synchronous to the pulse from the oscillator circuit 9.

A capacitor C4 is connected between the source of the field effect transistor FET and the returning side of the chamber 11, and a charging path 2 between the source of the FET and the capacitor C4 includes a resistor R6 to selectively set a charging time for the capacitor. This capacitor C4 is thus charged by the series of pulses through the transistor Q4 and the charging path 2. A discharging circuit 3 comprising a resistor R7 and a transistor Q5 is connected across the capacitor C4, in which the transistor Q5 is arranged to have the collector connected to the resistor R7; the emitter connected to the returning side of the chamber 11; and the base connected to the drain of the field effect transistor FET. A voltage charged in the capacitor C4 can be, thus, discharged through the discharging circuit 3 upon periodical switching on of the FET. The pulse for charging the capacitor and the pulse for switching on the FET are substantially synchronous each other. On the other hand, when the chamber 11 detects smoke from a fire and changes a potential at the junction point M to switch off the P-channel type field effect transistor FET the discharging circuit 3 is held open to allow the capacitor C4 to be continuously charged, so that the voltage of the capacitor C4 reaches a predetermined value.

Figure 4:
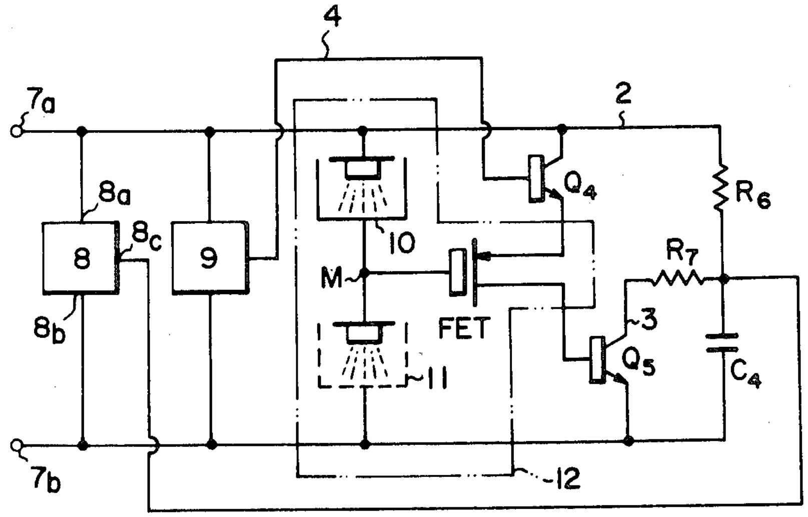
FIG. 4 is a circuit of another embodiment according to the present invention.

Another embodiment of the storage type smoke detector according to the invention illustrated in the FIG. 4 removes the transistor Q4 from the charging path 2 and the source of the field effect transistor FET by connecting the collector to the charging path 2 and the emitter to the source of the FET. In this arrangement the pulses of the oscillator circuit 9 only applies to field effect transistor FET, and the capacitor C4 always receives the power source current through the charging path 2. A time constant of the charging path which requires to reach a predetermined voltage in the capacitor C4 is selectively set longer than a cycle for discharging the capacitor voltage. When the chamber 11 receives smoke from a fire and an ionized current consequently reduces therein, the potential at the junction point M between the inner and outer chambers 10 and 11 raises to turn off the field effect transistor FET. Accordingly, the discharging circuit 3 is held open so that the capacitor C4 is continuously charged by the power source current through the charging path 2 without discharge. Meanwhile, if a failure takes place at the smoke detection circuit 12 or the oscillator circuit 9, the discharge of the capacitor C4 is stopped only to charge the capacitor C4. Such failure may be found by the predetermined voltage charged in the capacitor C4.

Figure 1:
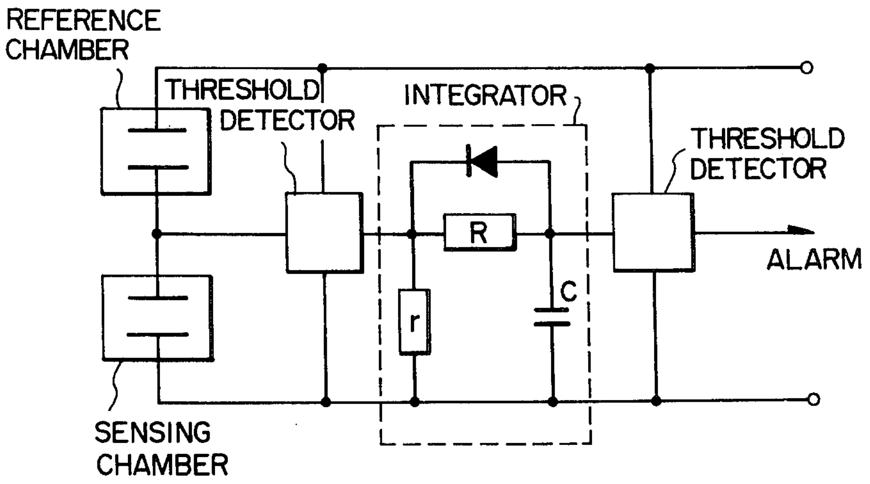
FIG. 1 (PRIOR ART)
FIG. 1 is a block diagram illustrating a known storage type smoke detector.
Figure 2:
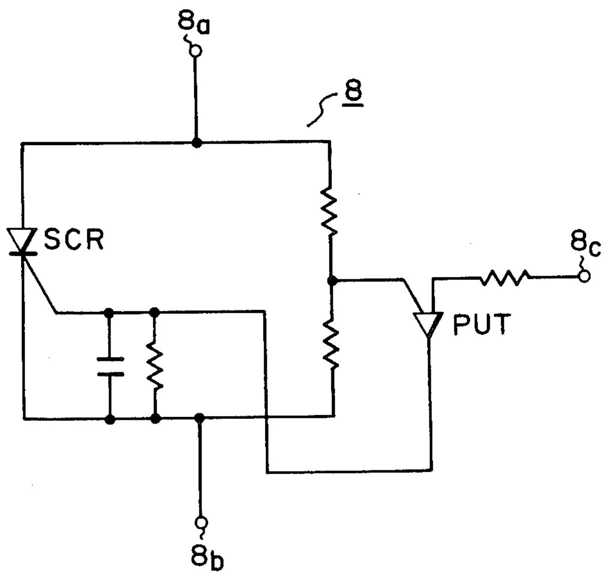
FIG. 2 is a switching circuit for a fire warning.

The predetermined voltage charged in the capacitor C4 successively activates the switching circuit 8 for urging an issuing of fire warning. A circuit illustrated in the FIG. 2 is, for an example, suitable for this purpose. A forward and backward terminals 8*a* and 8*b* of the switching circuit 8 are bidged between the connection terminals 7*a* and 7*b*, and a signal terminal 8*c* is connected to the positive side of the capacitor C4. A PUT is connected the anode to the signal terminal 8*c* via a resistor; the gate to a dividing point of a voltage division means; and the cathode to a gate of a thyristor SCR. The voltage division means and the thyristor SCR are connected in parallel between the pair terminals 8*a* and 8*b*. The operative condition for the PUT may be selectively set by changing a voltage division rate of the voltage division means for controlling the gate of the PUT. The predetermined voltage in the capacitor C4 can conduct the PUT thereby triggering the thyristor SCR, so that the connection terminals 7*a* and 7*b* are shorted by putting off the high impedance circuit. A signal receiver wired with the connection terminals 7*a* and 7*b* is urged to issue a fire warning by the increased current after the storage type smoke detector 1 with high impedance has been put off.

According to the present invention a relation between a time constant for charging the capacitor C4 and a cycle for discharging the capacitor voltage is, for an example, provided below:

Providing that an input voltage at the connection terminals 7*a* and 7*b* is 12 volts; the cpacitor C4 10 micro F; the resistor R6 3 Mohms; the predetermined value in the capacitor C4 7 volts; a pulse interval produced from the oscillator circuit 9 4 sec.; a pulse duty cycle 500 micro sec.; and the resistor R7 10 to 50 Kohms, the time constant for charging the capacitor is about 30 sec., and within such time the discharging circuit 3 can discharge the capacitor voltage seven times. As usually, the duty cycle 500 micro sec. is long enough to sufficiently discharge the capacitor voltage. The time constant for charging varies by changing a value of the registor R6, the capacitor C4, and/or the voltage for applying to the gate of the PUT. In additional, another voltage division means may be coupled with the base of the transistor Q5 in order to limit a current passing through the field effect transistor FET, if necessary.

What is claimed is:

1. A storage type smoke detector comprising:

a switching circuit connected between a pair of connection terminals of said detector, for shorting the pair of connection terminals upon receipt of a predetermined voltage, an oscillator circuit connected in parallel to said switching circuit, for producing a series of pulses, an ionization smoke sensor connected in parallel to said switching circuit, a P-channel type field effect transistor having a gate connected to an output end of said ionization smoke sensor and a source received a series of pulses from said oscillator circuit, a charging circuit including a capacitor connected in series to said connection terminals, for charging to a predetermined voltage effective to activate said switching circuit, a discharging circuit connected in parallel to said capacitor, for discharging a capacitor voltage by receiving an output pulse from a drain of said P-channel type field effect transistor, and means connected between the source of said field effect transistor and said oscillator circuit, for periodically switching on said field effect transistor, whereby the P-channel type field effect transistor periodically switches on to discharge the capacitor voltage until said transistor turns off by receiving the output from said ionization smoke sensor.

2. A storage type smoke detector according to claim 1, in which means for applying a series of the pulses to said P-channel type field effect transistor is interposed in said charging circuit for supplying said pulses both to said transistor and said capacitor.

3. A storage type smoke detector according to claim 1, in which said discharging circuit includes a transistor for closing said discharging circuit by receiving the periodical output from said P-channel type field effect transistor.

4. A storage type smoke detector according to claim 1, in which said switching circuit comprises a thyristor and a voltage division means in parallel connected between the pair of connection terminals and a PUT having an anode connected to the positive side of said capacitor; a gate to an output point of said voltage division means; and a cathode to a gate of said thyristor for shorting the pair of connection terminals upon receipt of the predetermined voltage charged in said capacitor.

* * * * *